United States Patent [19]

Baur et al.

[11] 4,410,445
[45] Oct. 18, 1983

[54] LIQUID-CRYSTALLINE DIELECTRIC HAVING A STEEP CHARACTERISTIC CURVE

[75] Inventors: Günter Baur; Bernd Scheuble, both of Freiburg i.Br.; Georg Weber, Erzhausen, all of Fed. Rep. of Germany

[73] Assignee: Merck Patent Gesellschaft mit Beschrankter Haftung, Darmstadt, Fed. Rep. of Germany

[21] Appl. No.: 276,398

[22] Filed: Jun. 22, 1981

[30] Foreign Application Priority Data

Jun. 26, 1980 [DE] Fed. Rep. of Germany ....... 3023989

[51] Int. Cl.³ .......................... C09K 3/34; G02F 1/13
[52] U.S. Cl. .......................... 252/299.5; 252/299.61; 252/299.63; 252/299.66; 252/299.67; 350/350 R
[58] Field of Search .................. 252/299.61, 299.63, 252/299.5, 299.66, 299.67; 350/350 R

[56] References Cited

U.S. PATENT DOCUMENTS

| | | | |
|---|---|---|---|
| 3,997,536 | 12/1976 | Boller et al. | 252/299.61 |
| 4,002,670 | 1/1977 | Steinstrasser | 252/299.64 |
| 4,011,173 | 3/1977 | Steinstrasser | 252/299.5 |
| 4,083,797 | 4/1978 | Oh | 252/299.64 |
| 4,130,502 | 12/1978 | Eidenschink et al. | 252/299.63 |
| 4,137,192 | 1/1979 | Matsufuji | 252/299.5 |
| 4,154,697 | 5/1979 | Eidenschink et al. | 252/299.60 |
| 4,181,625 | 1/1980 | Eidenschink et al. | 252/299.63 |
| 4,198,130 | 4/1980 | Boller et al. | 252/299.5 |
| 4,330,426 | 5/1982 | Eidenschink et al. | 252/299.63 |

FOREIGN PATENT DOCUMENTS

| | | | |
|---|---|---|---|
| 2257588 | 6/1973 | Fed. Rep. of Germany | 252/299.61 |
| 53-113785 | 10/1978 | Japan | 252/299.66 |
| 54-101784 | 8/1979 | Japan | 252/299.63 |
| 56-2370 | 1/1981 | Japan | 252/299.66 |
| 56-2377 | 1/1981 | Japan | 252/299.61 |
| 56-2379 | 1/1981 | Japan | 252/299.61 |
| 56-2381 | 1/1981 | Japan | 252/299.61 |
| 2031010 | 4/1980 | United Kingdom | 252/299.65 |

Primary Examiner—Teddy S. Gron
Attorney, Agent, or Firm—Millen & White

[57] ABSTRACT

Liquid crystalline dielectrics having steep characteristic curves comprise 5-85% by weight of at least one carboxylic acid ester of formula (I)

$$R_1-X-R_2 \quad (I)$$

wherein X is —CO—O— or —O—CO—, $R_1$ is alkyl of 1-7 C atoms, $R_2$ is

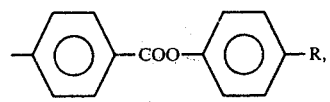

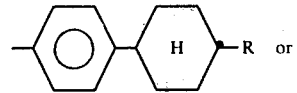

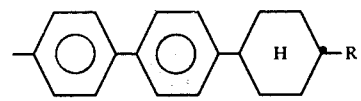

and R is alkyl of 1-7 C atoms which can be the same or different from $R_1$, and 95-15% by weight of at least one compound of the formulae (II) to (VI),

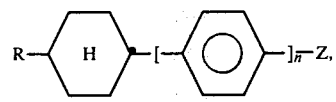

(II)

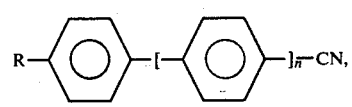

(III)

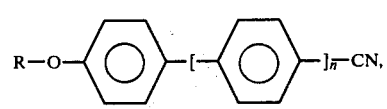

(IV)

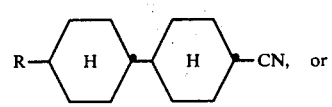

(V)

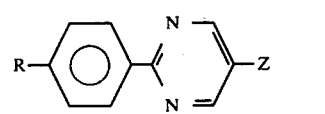

(VI)

wherein n is 1 or 2, Z is R', OR' or CN, R and R' being the same or different, and each being alkyl of 1-7 C atoms.

19 Claims, No Drawings

LIQUID-CRYSTALLINE DIELECTRIC HAVING A STEEP CHARACTERISTIC CURVE

BACKGROUND OF THE INVENTION

The present invention relates to a liquid-crystalline dielectric having a particularly steep characteristic curve.

The properties whereby nematic or nematic-cholesteric liquid-crystalline materials significantly vary their optical properties, such as light absorption, light scattering, birefringence, reflectivity or color, under the influence of electric fields are increasingly utilized for electro-optical display elements. The functioning of display elements of this type is based, for example, on the phenomena of dynamic scattering, the deformation of aligned phases, the Schadt-Helfrich effect in the twisted cell or the cholesteric-nematic phase transition.

For the industrial application of these effects in electronic components, liquid-crystalline dielectrics are required which must fulfill a large number of requirements. Chemical resistance to moisture, air and physical influences, such as heat, radiation in the infrared, visible and ultraviolet ranges, and continuous and alternating electric fields, is of particular importance. Industrially usable liquid-crystalline dielectrics are also required to have a liquid-crystalline mesophase in the temperature range from at least +10° C. to +50° C., preferably from 0° C. to 60° C., and the lowest possible viscosity at room temperature, which preferably should not exceed $70 \times 10^-$ Pa.s. Finally, they must not have any characteristic absorption in the range of visible light, i.e., they must be colorless.

None of the hitherto known classes of compounds having a liquid-crystalline mesophase includes an individual compound which forms a liquid-crystalline nematic mesophase within the required temperature range from 0° C. to 60° C. As a rule, therefore, mixtures of two or more compounds are prepared in order to obtain substances which can be used as liquid-crystalline dielectrics. For this purpose, at least one compound having a low melting point and clear point is usually mixed with another compound having a markedly higher melting point and clear point. This normally provides a mixture whose melting point is below that of the lower-melting component, while the clear point is between the clear points of the components. It is, however, not easy to prepare optimum dielectrics in this way, since the components having the high melting points and clear points frequently also impart a high viscosity to the mixtures. As a result, the switching times of the electro-optical display elements produced with these mixtures are extended in an undesirable manner.

Moreover, for all the types of display elements mentioned above, it is important that the contrast/voltage curve be as steep as possible in the region of the threshold voltage; that is, the display should be immediately activated up to the fullest possible contrast when the threshold voltage is slightly exceeded. Additionally, the threshold voltage itself should have only the lowest possible temperature dependence, so that the threshold voltages required for activating the display, especially at low temperatures, are not substantially higher than those required, for example, at room temperature.

Particularly valuable liquid-crystalline base materials which are already very widely used in liquid-crystalline dielectrics and which meet the above mentioned stability requirements and are colorless, include, in particular, the phenylcyclohexane derivatives or biphenylcyclohexane derivatives of formula (II)

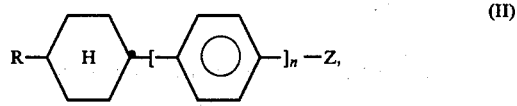

the alkylcyano-biphenyls or -terphenyls of the formula (III)

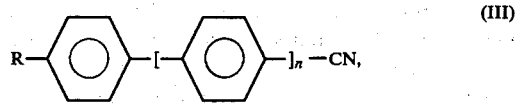

the alkoxycyano-biphenyls or -terphenyls of the formula (IV)

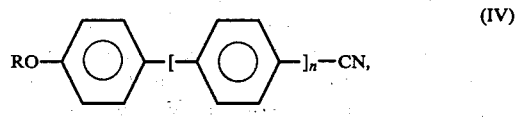

the cyclohexylcyclohexanes of the formula (V)

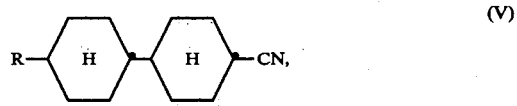

and the phenylpyrimidines of the formula (VI)

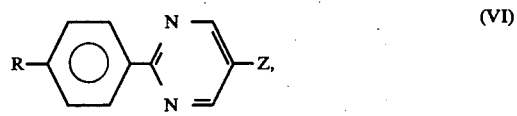

in which formulae (II) to (VI) n is 1 or 2, and Z is R', OR' or CN, R and R' being the same or different, and each being alkyl of 1–7 C atoms.

A large number of liquid-crystalline dielectrics based on these compounds is already commercially available. There is, however, still a great demand for liquid-crystalline dielectrics having the steepest possible characteristic curve (contrast/voltage curve), in particular for matrix display elements. In such matrix display elements, each "display point" of an electrode grid can be selectively triggered by applying a voltage to a first electrode layer consisting of a multiplicity of horizontal rows of conductors, and to another electrode layer consisting of a multiplicity of vertical rows of conductors. A disadvantage of these matrix display elements is the partial activation of display points in the immediate vicinity of a triggered display point, which partial activation is called "crosstalk" and reduces the contrast of the display in an undesirable manner. The steeper the characteristic curve of the liquid-crystalline dielectric used in a display element of this type, the less such cross-talk is observed.

As a rule, the steepness of the characteristic curve of a liquid-crystalline dielectric is expressed as the ratio of the control voltages V which must be applied to a given liquid crystal display element in order to obtain 90% of the maximum contrast ($V_{90}$) and 10% of the maximum contrast ($V_{10}$). The steepness of the characteristic curve is the greater, the smaller the ratio $$\gamma = (V_{90}/V_{10})$$

SUMMARY OF THE INVENTION

Accordingly, it is an object of this invention to provide liquid-crystalline dielectrics satisfying the above-described requirements and overcoming the above-described difficulties, such dielectrics having particularly steep characteristic curves and having a nematic phase within the required temperature range and, when used in liquid crystal cells, having switching times which are sufficiently short at room temperature.

Upon further study of the specification and appended claims, further objects and advantages of this invention will become apparent to those skilled in the art.

These objects have been attained by providing liquid-crystalline dielectrics having particularly steep characteristic curves obtained by mixing 15–95% by weight of one or more compounds of formulae (II) to (VI) with 85–5% by weight of at least one carboxylic acid ester of formula (I)

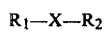 (I)

wherein X is —CO—O— or —O—CO—, $R_1$ is alkyl of 1–7 C atoms, $R_2$ is

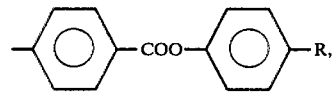

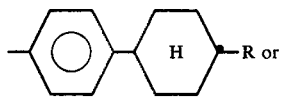

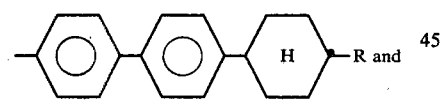

R is alkyl of 1–7 C atoms.

The present invention thus relates to a liquid-crystalline dielectric which comprises 5–85% by weight of at least one carboxylic acid ester of formula (I)

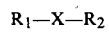 (I)

wherein $R_1$ is alkyl of 1–7 C atoms, $R_2$ is

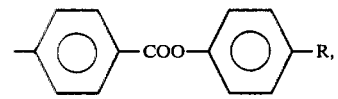

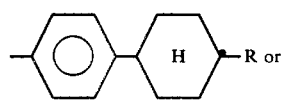

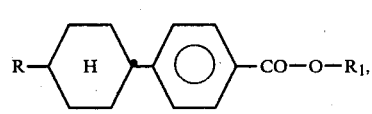

X is —CO—O— or —O—CO—, and 95–15% by weight of one or more compounds of formulae (II) to (VI) defined above.

Furthermore, the present invention relates to electro-optical display elements based on liquid crystal cells which contain a dielectric comprising 5–85% by weight of at least one carboxylic acid ester of formula (I) and 95–15% by weight of at least one of the compounds of formulae (II) to (VI).

DETAILED DISCUSSION

The carboxylic acid esters of formula (I) are either fatty acid esters of formula (Ia)

$$R_1—CO—O—R_2 \quad \text{(Ia)}$$

which comprise the 4-alkanoyloxybenzoic acid phenyl esters of the formula (Ib)

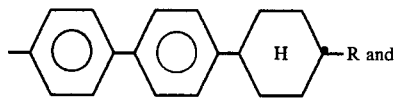

the 4-alkanoyloxycyclohexylbenzenes of formula (Ic)

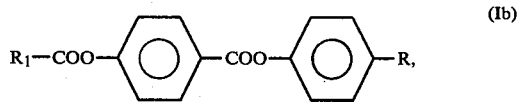

and the 4-alkanoyloxy-4'-cyclohexylbiphenyls of formula (Id)

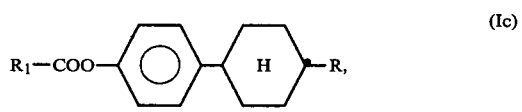

or benzoic acid ester derivatives of formula (Ie)

$$R_2—COO—R_1 \quad \text{(Ie),}$$

formula (Ie) covering the terephthalic acid esters of formula (If),

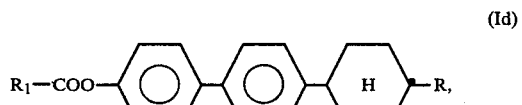

the 4-(4-alkylcyclohexyl)-benzoic acid alkyl esters of formula (Ig)

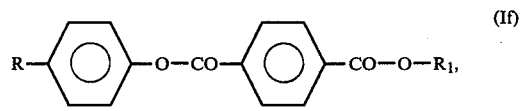

and the 4-(4-alkylcyclohexyl)-biphenyl-4'-carboxylic acid esters (Ih)

(Ih)

In the formulae (Ia) to (Ih), $R_1$, $R_2$ and R are as defined for formula (I); in the compounds of formulae (Ic), (Id), (Ig) and (Ih), containing a cyclohexane ring, this ring is in every case a trans-1,4-disubstituted cyclohexane ring. In the formulae, the trans-configuration is identified by the black marking on the right-hand side of the cyclohexane ring.

Liquid-crystalline dielectrics containing carboxylic acid esters of formula (I) are already known, for example from German Offenlegungsschriften No. 2,139,628 (U.S. Pat. No. 4,002,670), 2,636,684 (U.S. Pat. No. 4,130,502) and 2,927,277 (U.S. application Ser. No. 166,663, filed on July 7, 1980), whose disclosures are incorporated by reference herein. The dielectrics of this invention, however, containing 5–85% by weight of one or more carboxylic acid esters of this type and 95–15% by weight of one or more compounds of formulae (II) to (VI), and the fact that these dielectrics surprisingly have markedly steeper characteristic curves in liquid crystal display elements than all the previously known liquid-crystalline dielectrics based on the compounds (II) to (VI), have not yet been described.

Thus far, it has not been possible to provide an explanation for the fact that the dielectrics of this invention have a markedly steeper characteristic curve than known dielectrics based on only one of the component types (I) or (II) to (VI) and, if appropriate, also mesogenic compounds having different structures. However, without intending to limit this invention in any way, it is presumed that the elastic constants of the liquid crystal substances are influenced by molecular interactions, although it is not yet possible to make definite statements on this point.

Those dielectrics of this invention which contain 8 to 60% by weight, preferably 10 to 55% by weight, of at least one carboxylic acid ester of formula (I) and, correspondingly, 92 to 40, preferably 90 to 45% by weight of one or more compounds of formulae (II) to (VI), show particularly advantageous properties with respect to the steepness of the characteristic curve.

$R_1$ and R in the carboxylic acid esters of formula (I) can be identical or different from one another and, like R in the compounds of formulae (II) to (VI), are alkyl groups of 1–7 carbon atoms. When the alkyl groups contain 3 or more carbon atoms, these can be straight-chained or branched. However, those components which contain more than one branched alkyl group $R_1$ or R, are generally not used in the dielectrics according to the invention. Thus, within the scope of the present invention, branched alkyl groups of this type generally do not contain more than one chain branching; preferably, these are methyl or ethyl in the 1-position or 2-position of the carbon skeleton. Possible branched alkyl groups, accordingly, are in particular the following: 2-methylpropyl, 2-methylbutyl, 1-methylpentyl, 2-methylpentyl, and 1-methylhexyl. As a rule, the liquid-crystalline dielectrics of this invention contain only one component having a branched alkyl group in order to induce optical activity, if desired. Normally, not more than 10% by weight, preferably 0.5 to 3% by weight, of a component having a branched alkyl group is added for this purpose. Except for this, generally only those compounds of formulae (I) to (VI) in which the alkyl radicals $R_1$ and/or R are straight-chained, i.e., methyl, ethyl, n-propyl, n-butyl, n-pentyl, n-hexyl or n-heptyl, are used as components of the dielectrics of this invention.

In those components of the liquid-crystalline dielectrics of this invention which contain two alkyl groups as the wing groups or in the wing groups, i.e., the compounds of formula (I) and those of formulae (II) and (VI) wherein Z is R or OR, these wing groups contain a total of 2–14 carbon atoms. In such cases, it is preferred that the compounds used have wing groups containing a total of 4–12, especially 5–11, carbon atoms. Among the components of the liquid-crystalline dielectrics of this invention wherein one wing group is CN, those are preferred in which the other wing group contains 2–7 carbon atoms.

The preparation of the dielectrics of this invention is carried out in a manner which is conventional per se. As a rule, the desired quantity of the components used in a smaller quantity is dissolved in the component representing the main constituent, advantageously at an elevated temperature, (e.g., generally 80°–120° C.). If the temperature selected is above the clear point of the main constituent, the completeness of the solution process can be observed with particular ease.

In general, the dielectrics of this invention contain 2–14 compounds in total of formulae (I)–(VI) in accordance with the foregoing requirements, especially 3–12, most especially 5–10. Further in general, they contain 1–10 compounds of formulae (II)–(VI), especially 2–9, most especially 4–8; and 1–4 compounds of formula I, especially 1–3, most especially 1–2. Percentages of all compounds of formulae (II) to (VI) relative to one another and percentages of all compounds of formula (I) relative to one another are not critical and are selected as desired.

It is also possible, however, to mix solutions of the components in a suitable organic solvent, for example acetone, chloroform or methanol, and, after through mixing, to remove the solvent, for example by distillation under reduced pressure. Of course, it is necessary in this procedure to take care that no impurities or undesired doping substances are introduced by the solvent.

The liquid-crystalline dielectrics of this invention can be modified by suitable additives in such a way that they can be used in all hitherto disclosed types of liquid crystal display elements. Additives of this type are known to those skilled in the art and are extensively described in the relevant literature. For example, substances can be added for varying the dielectric anisotropy, the viscosity, the conductivity and/or the orientation of the nematic phases. Substances of this type are described, for example, in German Offenlegungsschriften Nos. 2,209,127, 2,240,864, 2,321,632, 2,338,281, 2,535,046, 2,637,430 and 2,900,312, whose disclosures are incorporated by reference herein.

As for all of the compounds of formula I, all of the compounds of formulae (II)–(VI) are known and can be prepared by well known, fully conventional procedures.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following example(s), all temperatures are set forth uncorrected in degrees Celsius; unless otherwise indicated, all parts and percentages are by weight.

In the examples, m.p. denotes the melting point; c.p. denotes the clear point of a liquid-crystalline substance in degrees centigrade; boiling points are marked b.p.

EXAMPLE 1

The liquid-crystalline base mixture consisting of 24% of 4-(trans-4-n-propylcyclohexyl)-benzonitrile, 36% of 4-(trans-4-n-pentylcyclohexyl)-benzonitrile, 25% of 4-(trans-4-n-heptylcyclohexyl)-benzonitrile and 15% of 4-(trans-4-n-pentylcyclohexyl)-4'-cyanobiphenyl has a nematic phase in the temperature range from −6° C. to +71° C. and a characteristic curve of a steepness of $\gamma = 1.57$. From 70% of this mixture and 30% of 4-n-hexanoyloxybenzoic acid 4-n-propylphenyl ester, a dielectric of this invention is obtained which has a nematic phase in the temperature range from −5° C. to +66° C. and a steepness of the characteristic curve of $\gamma = 1.41$.

EXAMPLE 2

From 70% of the liquid-crystalline base mixture of Example 1 and 30% of trans-4-n-propyl-1-(4-n-pentanoyloxyphenyl)-cyclohexane, a dielectric of this invention is obtained which has a nematic phase in the temperature range from −12° C. to +58° C. and a steepness of the characteristic curve of $\gamma = 1.48$.

EXAMPLE 3

From 70% of the liquid-crystalline base mixture described in Example 1 and 30% of 4-(trans-4-n-propylcyclohexyl)-biphenyl-4'-carboxylic acid butyl ester, a dielectric of this invention is obtained which has a nematic phase in the temperature range from +15° C. to +99° C. and a steepness of the characteristic curve of $\gamma = 1.48$.

EXAMPLE 4

The liquid-crystalline base mixture consisting of 14% of 4-ethyl-4'-cyanobiphenyl, 10% of 4-n-propoxy-4'-cyanobiphenyl, 12% of 4-(trans-4-ethylcyclohexyl)-benzonitrile, 23% of 4-(trans-4-n-butylcyclohexyl)-benzonitrile, 20% of 4-(trans-4-ethylcyclohexyl)-benzoic acid (trans-4-n-propyl)-cyclohexyl ester and 21% of 4-(trans-4-n-butylcyclohexyl)-benzoic acid (trans-4-n-propyl)-cyclohexyl ester has a nematic phase in the temperature range from −5° C. to +67° C. and a steepness of the characteristic curve of $\gamma = 1.44$. From 70% of this base mixture and 30% of 4-n-hexanoyloxybenzoic acid 4-n-heptylphenyl ester, a liquid-crystalline dielectric is obtained which has a nematic phase in the temperature range from −2° C. to +63° C. and a steepness of the characteristic curve of $\gamma = 1.40$.

EXAMPLE 5

The liquid-crystalline base mixture consisting of 51% of 4-n-pentyl-4'-cyanobiphenyl, 25% of 4-n-heptyl-4'-cyanobiphenyl, 16% of 4-n-octyloxy-4'-cyanobiphenyl and 8% of 4-n-pentyl-4''-cyano-p-terphenyl has a nematic phase in the temperature range from −8° C. to +58° C. and a steepness of the characteristic curve of $\gamma = 1.45$. From 70% of this liquid-crystalline base mixture and 30% of 4-n-hexanoyloxybenzoic acid 4-n-propylphenyl ester, a dielectric is obtained which has a nematic phase in the temperature range from −5° C. to +56° C. and a steepness of the characteristic curve of $\gamma = 1.39$.

EXAMPLE 6

4-(Trans-4-n-propylcyclohexyl)-benzonitrile has a nematic phase in the temperature range from 42° C. to 45° C. and a steepness of its characteristic curve of $\gamma = 1.59$. From 50% of this compound, 27.5% of 4-n-hexanoyloxybenzoic acid 4-n-propylphenyl ester and 22.5% of 4-n-hexanoyloxybenzoic acid 4-n-heptylphenyl ester, a liquid-crystalline dielectric is obtained which has a nematic phase in the temperature range from +5° C. to +49° C. and a steepness of the characteristic curve of $\gamma = 1.37$.

EXAMPLE 7

The liquid-crystalline base mixture consisting of 15% of 4-(trans-ethylcyclohexyl)-benzonitrile, 21% of 4-(trans-4-n-propylcyclohexyl)-benzonitrile, 16% of 4-(trans-4-n-butylcyclohexyl)-benzonitrile, 31% of 4-(trans-4-n-pentycyclohexyl)-benzonitrile, 9% of 4-(trans-4-n-pentylcyclohexyl)-4'-cyanobiphenyl and 8% of 4-n-pentyl-4''-cyano-p-terphenyl has a nematic phase in the temperature range from −12° C. to +68° C. and a characteristic curve of a steepness of $\gamma = 1.55$. From 66% of this mixture and 34% of trans-4-n-propyl-1-(4-n-butyryloxyphenyl)-cyclohexane, a dielectric of this invention is obtained which has a nematic phase in the temperature range from −23° C. to +58° C. and a steepness of the characteristic curve of $\gamma = 1.45$.

EXAMPLE 8

The liquid-crystalline base mixture consisting of 14% of 4-(trans-4-ethylcyclohexyl)-benzonitrile, 21% of 4-(trans-4-n-butylcyclohexyl)-benzonitrile, 15% of 4ethyl-4'-cyanobiphenyl, 22% of 4-n-butyl-4'-cyanobiphenyl, 15% of 4-(trans-4-n-pentylcyclohexyl)-4'-cyanobiphenyl and 13% of 4-n-pentyl-4''-cyano-p-terphenyl has a nematic phase in the temperature range from +6° C. to +75° C. and a steepness of the characteristic curve of $\gamma = 1.47$. From 70% of this base mixture and 30% of trans-4-n-propyl-1-(4-n-butyryloxyphenyl)-cyclohexane, a liquid-crystalline dielectric is obtained which has a nematic phase in the temperature range from −5° C. to +63° C. and a steepness of the characteristic curve of $\gamma = 1.41$.

EXAMPLE 9

The liquid-crystalline base mixture consisting of 10% of trans-trans-4-n-propylcyclohexyl-cyclohexane-(4')-carbonitrile, 10% of trans-trans-4-n-pentylcyclohexyl-cyclohexane-(4')-carbonitrile, 28% of 4-(trans-4n-propylcyclohexyl)-benzonitrile, 40% of 4-(trans-4-n-pentylcyclohexyl)-benzonitrile and 12% of 4-(trans-4-n-pentylcyclohexyl)-4'-cyanobiphenyl has a nematic phase in the temperature range from −4° C. to +75° C. and a steepness of the characteristic curve of $\gamma = 1.60$. From 80% of this liquid-crystalline base mixture and 20% of 4-n-hexanoyloxybenzoic acid 4-n-propylphenyl ester, a dielectric is obtained which has a nematic phase in the temperature range from −9° C. to +72° C. and a steepness of the characteristic curve of $\gamma = 1.47$.

EXAMPLE 10

The liquid-crystalline base mixture consisting of 13% of trans-trans-4-n-propylcyclohexyl-cyclohexane-(4')-carbonitrile, 13% of trans-trans-4-n-pentylcyclohexyl-cyclohexane (4')-carbonitrile, 57% of 4-(trans-4-n-pentylcyclohexyl)-benzonitrile and 17% of 4-(trans-4-n-pentylcyclohexyl)-4'-cyanobiphenyl has a nematic phase in the temperature range from +9° C. to +87° C. and a steepness of the characteristic curve of $\gamma=1.59$. From 53% of this base mixture, 17% of 4-n-hexanoyloxybenzoic acid 4-n-propylphenyl ester and 30% of 4-n-hexanoyloxybenzoic acid 4-n-heptylphenyl ester, a dielectric of this invention is obtained which has a nematic phase in the temperature range from −7° C. to +75° C. and a steepness of the characteristic curve of $\gamma=1.41$.

EXAMPLE 11

The liquid-crystalline base mixture consisting of 27% of 4-(trans-4-n-propylcyclohexyl)-benzonitrile, 22% of 4-(trans-4-n-butylcyclohexyl)-benzonitrile, 39% of 4-(trans-4-n-pentylcyclohexyl)-benzonitrile and 12% of 4-(trans-4-n-pentylcyclohexyl)-4'-cyanobiphenyl has a nematic phase in the temperature range from −5° C. to +67° C. and a characteristic curve of a steepness of $\gamma=1.57$. From 87% of this mixture, 5% of 4-(trans-4-n-pentylcyclohexyl)-4'-acetoxybiphenyl and 8% of 4-(trans-4-n-pentylcyclohexyl)-4'-n-pentanoylbiphenyl, a dielectric of this invention is obtained which has a nematic phase in the temperature range from −9° C. to +83° C. and a steepness of the characteristic curve of $\gamma=1.47$.

EXAMPLE 12

The liquid-crystalline base mixture consisting of 14% of 4-ethyl-4'-cyanobiphenyl, 23% of 4-n-butyl-4'-cyanobiphenyl, 20% of 4-(trans-4-ethylcyclohexyl)-benzonitrile, 22% of 4-(trans-4-n-butylcyclohexyl)-benzonitrile, 12% of 4-(trans-4-pentylcyclohexyl)-4'-cyanobiphenyl and 9% of 4-n-pentyl-4''-cyano-p-terphenyl has a nematic phase in the temperature range from −7° C. to +59° C. and a steepness of the characteristic curve of $\gamma=1.47$. From 87% of this base mixture 5% of 4-(trans-4-n-pentylcyclohexyl)-4'-acetoxy-biphenyl and 8% of 4-(trans-4-n-pentylcyclohexyl)-4'-pentanoyloxybiphenyl, a liquid-crystalline dielectric is obtained which has a nematic phase in the temperature range from −10° C. to +76° C. and a steepness of the characteristic curve of $\gamma=1.43$.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

We claim:

1. A liquid crystalline dielectric, comprising
   (i) 5–85% by weight of at least one carboxylic acid ester of formula (I)

$R_1-X-R_2$      (I)

wherein

X is —CO—O— or —O—CO—,
   $R_1$ is alkyl of 1–7 C atoms,
   $R_2$ is

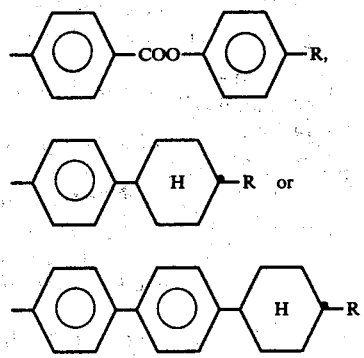

and R is alkyl of 1–7 C atoms which can be the same or different from $R_1$, and
   (ii) 95–15% by weight of at least one compound of the formulae A–C,

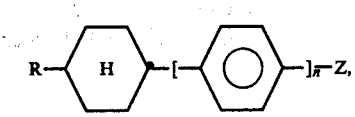  (A)

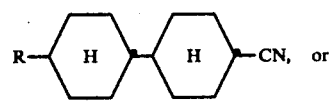  (B)

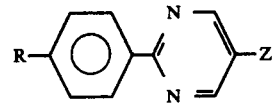  (C)

wherein n is 1 or 2, Z is R', OR' or CN, R and R' being the same or different, and each being alkyl of 1–7 C atoms.

2. A liquid-crystalline dielectric of claim 1, comprising at least one compound of formula I wherein X is —CO—O—.

3. A liquid-crystalline dielectric of claim 1 comprising 8–60% by weight of at least one carboxylic acid ester of formula (Ib)

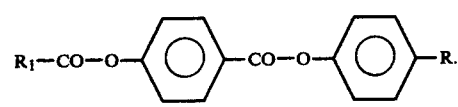  (Ib)

4. A liquid-crystalline dielectric of claim 1 comprising 8–60% by weight of at least one carboxylic acid ester of formula (Ic)

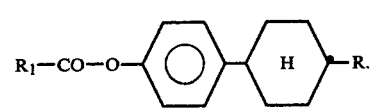  (Ic)

5. A liquid-crystalline dielectric of claim 1 wherein the alkyl groups $R_1$ and R in the compounds of formula (I) contain a total of 5–11 C atoms.

6. A liquid-crystalline dielectric of claim 1 wherein each compound of formulae (A) to (C) has a cyano group.

7. A liquid-crystalline dielectric of claim 1 comprising 8-60% by weight of at least one compound of formula (I) and 92-40% by weight of at least one compound of formulae (A) to (C).

8. A liquid-crystalline dielectric of claim 1 wherein all alkyl groups are straight-chained.

9. An electro-optical display device having a liquid crystal cell comprising a dielectric of claim 1.

10. An electro-optical display device of claim 9 wherein the liquid crystal cell is a twisted nematic cell.

11. A liquid crystalline dielectric of claim 1 wherein component (ii) comprises a compound of formula A wherein n is 2.

12. A liquid crystalline dielectric of claim 1 wherein component (ii) comprises a compound of formula B.

13. A liquid crystalline dielectric of claim 1 wherein component (ii) comprises a compound of formula C.

14. A liquid crystalline dielectric of claim 1 wherein in component (i), X is —CO—O—.

15. A liquid crystalline dielectric of claim 1 wherein in component (i), X is —O—CO—.

16. A liquid crystalline dielectric of claim 1 wherein $R_2$ is

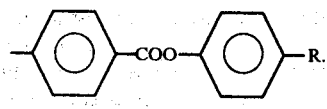

17. A liquid crystalline dielectric of claim 1 wherein $R_2$ is

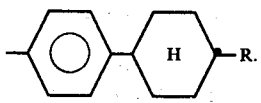

18. A liquid crystalline dielectric of claim 1 wherein $R_2$ is

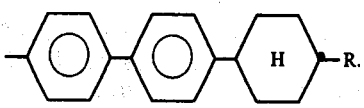

19. A liquid crystalline dielectric of claim 1 wherein component (ii) comprises a compound of formula A wherein n is 1.

* * * * *